(12) United States Patent
Tato et al.

(10) Patent No.: US 7,729,914 B2
(45) Date of Patent: Jun. 1, 2010

(54) METHOD FOR DETECTING EMOTIONS INVOLVING SUBSPACE SPECIALISTS

(75) Inventors: Raquel Tato, Stuttgart (DE); Thomas Kemp, Remseck (DE); Krzystof Marasek, Warsaw (PL)

(73) Assignee: Sony Deutschland GmbH, Cologne (DE)

( * ) Notice: Subject to any disclaimer, the term of this patent is extended or adjusted under 35 U.S.C. 154(b) by 1065 days.

(21) Appl. No.: 10/264,643

(22) Filed: Oct. 4, 2002

(65) Prior Publication Data

US 2003/0069728 A1    Apr. 10, 2003

(30) Foreign Application Priority Data

Oct. 5, 2001    (EP)    .................... 01123867

(51) Int. Cl.
G10L 21/00    (2006.01)
G10L 15/00    (2006.01)
(52) U.S. Cl. .................... 704/270; 704/231
(58) Field of Classification Search ............ 704/270, 704/231
See application file for complete search history.

(56) References Cited

U.S. PATENT DOCUMENTS 6,006,188 A * 12/1999 Bogdashevsky et al. ..... 704/270
6,157,913 A * 12/2000 Bernstein .................... 704/275
6,173,260 B1 * 1/2001 Slaney ........................ 704/250
6,480,826 B2 * 11/2002 Pertrushin ................... 704/270
6,638,217 B1 * 10/2003 Liberman ................... 600/300

OTHER PUBLICATIONS

Cowie: "Describing the Emotional States Expressed in Speech" ISCA Workshop on Speech and Emotion, 'Online! 2000, pp. 1-8, XP002191998 Belfast Retrieved from the Internet: <URL:http://www.qub.ac.uk/en/isca/proceedings/index.html> 'retrieved on Mar. 4, 2002!
Cowie et. al.: "Emotion Recognition in Human-Computer Interaction" IEEE Signal Processing Magazine, Jan. 1, 2001, pp. 32-80, XP002191161.
Murray I R et al: "Toward the Simulation of Emotion in Synthetic Speech: A Review of the Literature on Human Vocal Emotion" Journal of the Acoustical Society of America, American Institute of Physics. New York, US, vol. 93, No. 2, Feb. 1, 1993, pp. 1097-1108, XP000348831 ISSN: 0001-4966.
Roach: "Techniques for the Phonetic Description of Emotional Speech" ISCA Workshop on Speech and Emotion, 'Online! 2000, pp. 1-7, XP002191999 Belfast Retrieved from the Internet: <URL:http//www.qub.ac.uk/en/isca/proceedings/index.html> 'retrieved on Mar. 4, 2002!

(Continued)

*Primary Examiner*—Angela A Armstrong
(74) *Attorney, Agent, or Firm*—Oblon, Spivak, McClelland, Maier & Neustadt, L.L.P.

(57) ABSTRACT

To detect and determine a current emotional state (CES) of a human being from a spoken speech input (SI), it is suggested in a method for detecting emotions to identify first and second feature classes (A, E) with, in particular distinct, dimensions of an underlying emotional manifold (EM) or emotional space (ES) and/or with subspaces thereof.

10 Claims, 2 Drawing Sheets

OTHER PUBLICATIONS

Pereira: "Dimensions of Emotional Meaning in Speech" ISCA Workshop on Speech and Emotion, 'Online! 2000, pp. 1-4, XP002192000 Belfast Retrieved from the Internet: <URL:http://www.qub.ac.uk/en/isca/proceedings/index.html> 'retrieved on Mar. 4, 2002!

Mcgilloway et. al.: "Approaching Automatic Recognition of Emotion from Voice: a Rough Benchmark" ISCA Workshop on Speech and Emotion, 'Online! 2000, XP002192001 Belfast Retrieved from the Internet: <URL:http://www.qub.ac.uk/en/isca/proceedings/index.html> 'retrieved on Mar. 4, 2002!

Scherer: "Emotion Effects on Voice and Speech: Paradigms and Approaches to Evaluation" ISCA Workshop on Speech and Emotion, 'Online! 2000, pp. 1-65, XP002192002 Belfast Retrieved from the Internet: <URL:http://www.qub.ac.uk/en/isca/proceedings/index.html> 'retrieved on Mar. 4, 2002!

* cited by examiner

METHOD FOR DETECTING EMOTIONS INVOLVING SUBSPACE SPECIALISTS

The present invention relates to a method for detecting emotions and in particular to a method for detecting emotions from speech input by involving so-called subspace specialists.

In many applications, it is desired to detect the current emotional state of a human speaker, e.g. of a user of an equipment, or the like. Many methods for detecting the emotional state of a human being have been described. Many of these known methods employ and evaluate different sources of features, visual sources, acoustical sources, and other physiological sources, e.g. tension, humidity and temperature of the skin, blood pressure, the rate of the beating heart, and/or the like.

In the case of acoustical speech input, however, emotion detection is a very difficult problem, because the inter-speaker variance of emotional speech is very high. Therefore, evaluation of a single class of features of the speech input might not be sufficient to detect a current emotional state of a human speaker in a confident way.

It is an object of the present invention to provide a method for detecting emotions from acoustical speech in which the error of such a detection is particularly low and the detection itself is more accurate and more refined.

The invention is based on the finding and on the assumption that the variety of human emotions and affects can be represented in a multidimensional space in particular of two dimensions—and that every or both dimensions are relevant for a classification and recognition.

According to the invention, in the method for detecting emotions from speech input—in particular of at least one speaker—at least a first feature class and a second feature class of features are at least in part evaluated, derived and/or extracted from a given speech input. From said features and/or from parameters thereof a current emotional state of a current speaker and/or parameters thereof are derived. Said first and second feature classes are identified and/or associated with, in particular distinct, dimensions of an underlying emotional manifold or space and/or with subspaces thereof, in particular with activation or arousal and evaluation or pleasure, respectively.

It is therefore a key idea of the present invention to identify and/or associate the distinct first and second feature classes with dimensions of a given emotional manifold, emotional space and/or with subspaces thereof. In contrast to state of art methods for detecting emotions from speech, the present invention not only involves several feature classes but also identifies and therefor maps said feature classes to the dimensions of the emotional manifold or emotional space to give a refinement of the description of the features and therefore a refinement of the detecting process of the emotional states of the speaker. This may be done based on the different degrees of complexity for each dimension.

According to a preferred embodiment of the present invention it is suggested to use and/or to construct for each feature class, for each dimension/subspace of said emotional manifold and/or for groups thereof in each case a separate and/or distinct specialist—in particular subspace specialist, or the like—or a specialized classifier system. Each of said specialized classifier systems is in particular adapted to obtain, generate, evaluate and/or classify features essentially from one assigned feature class and/or from an assigned dimension or subspace of emotions. In general, there are features which are necessary for a distinct classifier only. Additionally, there might be features which are used by several or all classifiers.

Here, a feature class for a given classifier Is referred to be the complete set of features necessary for said certain classifier.

In a further advantageous embodiment of the inventive method for detecting emotions from speech the distinct specialized classifier systems are applied to the different feature classes already extracted from said speech input and/or to said speech input directly. Further, the thereby evaluated, derived and/or extracted features, emotions, and/or parameters thereof, in particular from different feature subspaces, are collected and/or stored in particular in order to obtain a final classification by combination of the results.

It is preferred that the features, emotions, and/or parameters thereof evaluated, derived and/or extracted, in particular from different feature subspaces, are combined, in particular to describe a current emotional state of the current user and/or of parameters thereof.

In a further preferred embodiment of the inventive method for detecting emotions from speech distinct specialized classifier systems and/or the features or outputs thereof are combined, fused and/or merged, in particular to form a global classifier system and/or—in the case of non-orthogonal subspaces or classifier systems—in particular by means of a empirical weighting algorithm, or the like. This is done so as to deal and take into account common human speaking behaviour and the dependence thereof from the underlying emotional state.

It is of advantage to use a class of prosodic features at least as a part of said first feature class, which is in particular at least in part identified with an activation and/or an arousal dimension of emotions or of the emotional manifold.

Alternatively or additionally, it is of further advantage to use a class of speech and/or voice quality features at least as a part of said second feature class, which is in particular at least in part identified with a pleasure and/or evaluation dimension of emotions or of the emotional manifold.

It is further preferred to use a—in particular unidimensional—classifier system of a low complexity, in particular as a classifier system for prosodic features or for a prosodic feature class.

Additionally or alternatively, it is preferred to use a—in particular unidimensional—classifier system of high complexity, in particular as a classifier system for speech and/or voice quality features or for a voice and/or speech quality feature class.

Unidimensional or one-dimensional classifier system are here referred to as classifier system which do not mix their outputs.

In particular said classifier system of high complexity may include a multiplicity of single classifiers, in particular by implementing speaker dependencies. These speaker dependencies may include age, gender and/or the like.

According to a further aspect of the invention the different classifiers can give as an output not only proper emotions, but also a degree of emotions, in particular a degree of pleasure and/or activation, depending on the feature subspaces they have as an input, which can be combined afterwards to obtain a current emotional state of the speaker.

As prosodic features, pitch, pitch range, intonation attitude, loudness, speaking rate, phone duration, speech element duration features and/or the like may be used.

As speech and/or voice quality features phonation type, articulation manner, voice timbre features, spectral tilt, amplitude difference between harmonics and formants, formants bandwidth, jitter, harmonic-to-noise ratio features and/or the like may be used.

It is a further aspect of the present invention to provide a system, an apparatus, a device, and/or the like for detecting emotions from input speech which is, in each case, capable of performing and/or realizing the inventive method for detecting emotions from speech input and/or its steps.

According to a further aspect of the present invention, a computer program product is provided, comprising computer program means which is adapted to perform and/or to realize the inventive method for detecting emotions from speech input and/or its steps when it is executed on a computer, a digital signal processing means and/or the like.

Further aspects of the present invention become more apparent from the following remarks:

One basic idea of the present invention is to use emotional dimensions in order to design a classifier for automatic emotion recognition or detection. The variety of human emotions and affects can be represented in a multidimensional space or manifold, in particular of two dimensions. One dimension, for example, refers to activation or arousal. The other dimension refers to evaluation or pleasure. Emotions which are placed in the same area of the emotional manifold or emotional space have similar features in terms of acoustics and they are more difficult to classify. Therefore, the application of subspace specialists and a technique thereof based on the association of the emotional dimensions and the feature space can give better recognition rates and can lower detection errors.

Common and known emotion classification schemes use different classifiers, such as neural networks, learning vector quantization, linear discriminant analysis, cart regression trees, nearest neighbour, K-nearest neighbour, and/or the like.

Recognizing emotion from a speech signal is not an easy task. Until now, most of the known classifiers make use of prosody features or prosodic features. These prosodic features are easy to handle, but they give only information about a so-called activation or arousal dimension of emotions.

It is an aspect of the present invention to take into account at least one second dimension of the emotional space. In particular, it is suggested to evaluate the pleasure or evaluation dimension of said emotional space or emotional manifold. Such a dimension is very much influenced by quality features of the speech or the voice, i.e. by auditory features that arise from variations in the source signal and the vocal tract properties. These quality features are very speaker-dependent.

One of the main problems when designing a classifier for emotion recognition or emotion detection from the speech is the fact that the same emotion can be expressed or mapped onto different features, depending on the speaker. Some speakers make changes in only one of the possible emotional dimensions in the emotional space. For speakers, who make use of a multiplicity of such emotional dimensions, it is difficult to define a common range of emotions.

Assuming that a multiplicity of dimensions of the emotional space—in the above-mentioned case two dimensions are used—is relevant for an accurate emotional classification and that those emotions relate to different features of the speech with a different degree of complexity, a proposal according to the invention is to use both concepts in order to get an optimal design for the classifier.

One idea behind the present invention is to make use of a multiplicity of emotional dimensions in order to design a classifier for automatic emotion recognition and detection. This idea is combined with a further idea to apply a subspace specialist technique based on the association of the emotional dimensions and the feature space. Basically, it would be sufficient in accordance with one aspect of the invention to involve the application of different classifiers for each of the feature subspaces assigned to prosodic features and to quality features and to combine the results from the different classifiers.

A further aspect of the present invention is to improve this key idea by one of the following two approaches or by a combination of them.

(a) Since both dimensions of the emotional space on the basis of a two-dimensional concept relate to different features of the speech with different degree of complexity, it makes sense to divide the problem and design two classification techniques. Each of these classification techniques looks at a sub-space of the emotional manifold or emotional subspace and therefore looks at different features. For the most problematic case, i.e. for the quality feature subspace, it may be intended to use more than one classifier for said subspace and even some kind of speaker dependency may be involved such as age, gender, and the like. A final classification algorithm will then be implemented afterwards to merge the results of the subspace specialists.

(b) On the other hand it is rather easy to determine the degree of pleasure and activation for a given emotion. Therefore, it is possible based on this knowledge to infer the classification of such emotion with a set of candidates. For that purpose it is necessary either to have a training data base appropriately labelled with different levels of activation and pleasure, or a database labelled with emotions and then associate each of these emotions with fixed coordinates in both dimensions, activation and pleasure. The classification will be accomplished in terms of such levels and there will be a mapping from certain areas of the emotional space to different emotions.

In the following, further advantageous aspects of the present invention will be described taking reference to the accompanying Figures.

In the foregoing and in the following, for brevity, the feature classes for the distinct emotional dimensions A and E are also denoted by A and E, respectively.

Figure 1:
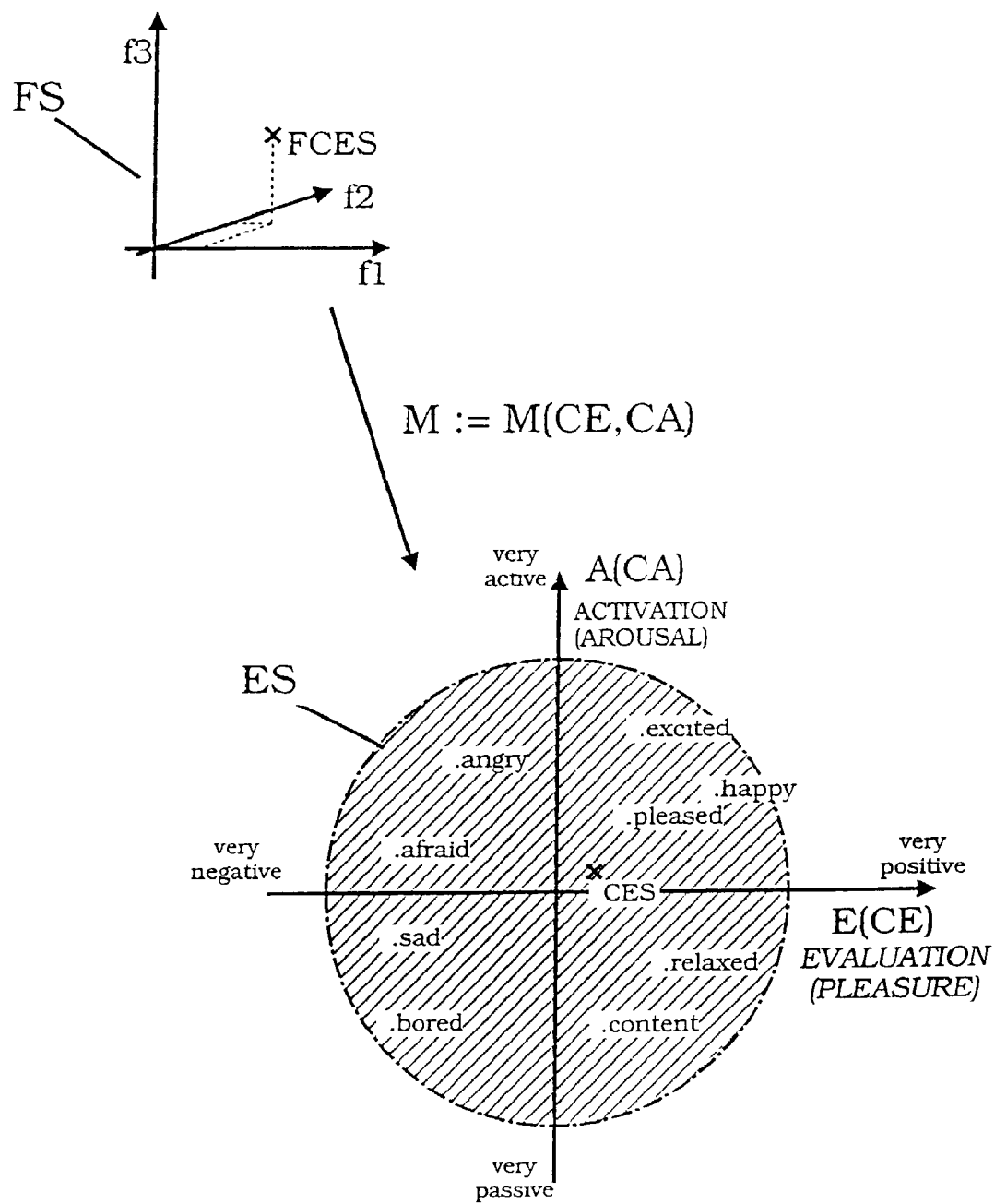
FIG. 1 is a schematical diagram showing the connection between a given emotional space and a respective feature space.

In the schematical diagram of FIG. 1 an emotional space ES is given as a more or less abstract entity reflecting possible emotional states CES of a speaker per se. Each point of said emotional space ES therefore represents a possible current emotional state CES of a given speaker. Analyzing a speech input SI and extracting features f1, f2, f3 or feature values therefrom on the basis of a given set of feature classes E, A a mapping M from the so-called feature space FS into the emotional space ES is defined. Each point FCES in the feature space FS is represented as a n-tuple <f1, f2, f3> of parameter values or feature values of extracted features f1, f2, and f3 and therefore is a parameter representation and/or approximation of a possible current emotional state CES.

The abscissa and the ordinate of the emotional space ES are assigned to the distinct feature classes E and A, whereas the axes of the feature space FS are assigned to distinct features to be extracted from a speech input SI. The value of the distinct feature parameter is determined by means of the speech input analysis. The value or degree for the distict emotional dimensions in the emotional space—i.e. the degrees of e.g. arousal A and evaluation E—are determined by the distinct assigned classifiers CE and CA.

In general, there are features which are necessary for CA only or for CE only. Additionally, there might be features which are used by both classifiers CE and CA. In the case of unidimensional or one-dimensional classifiers CA and CE do not mix their outputs with respect to the dimensions A and E, respectively, i.e. CA classifies for A only, and CE classifies for E only.

Each possible emotional state CES is therefore referred to as an image obtained by the mapping M of a distinct point FCES or n-tuple of parameters in the feature space FS. The axes of the emotional space ES and therefore its dimensions E and A are assigned to the given feature classes for E and A within the emotional space ES. These dimensions define the image CES of the parameter representation FCES and therefore classify the current emotional state CES of a given current speaker as being active or passive and/or as being negative or positive.

With respect to each dimension of the emotional space ES a definite and different classifier CA, CE is applied, having as an input the corresponding feature class A, E and as an output the position of the point CES in the emotional space ES regarding the assigned axis or dimension. Therefore, within the dimensions of activation/arousal and evaluation/pleasure a given speaker might be classified as being sad, bored, content, relaxed, pleased, happy, excited, angry, afraid, and/or the like, each property being represented by distinct degrees within the corresponding emotional dimensions A and E.

Figure 2:
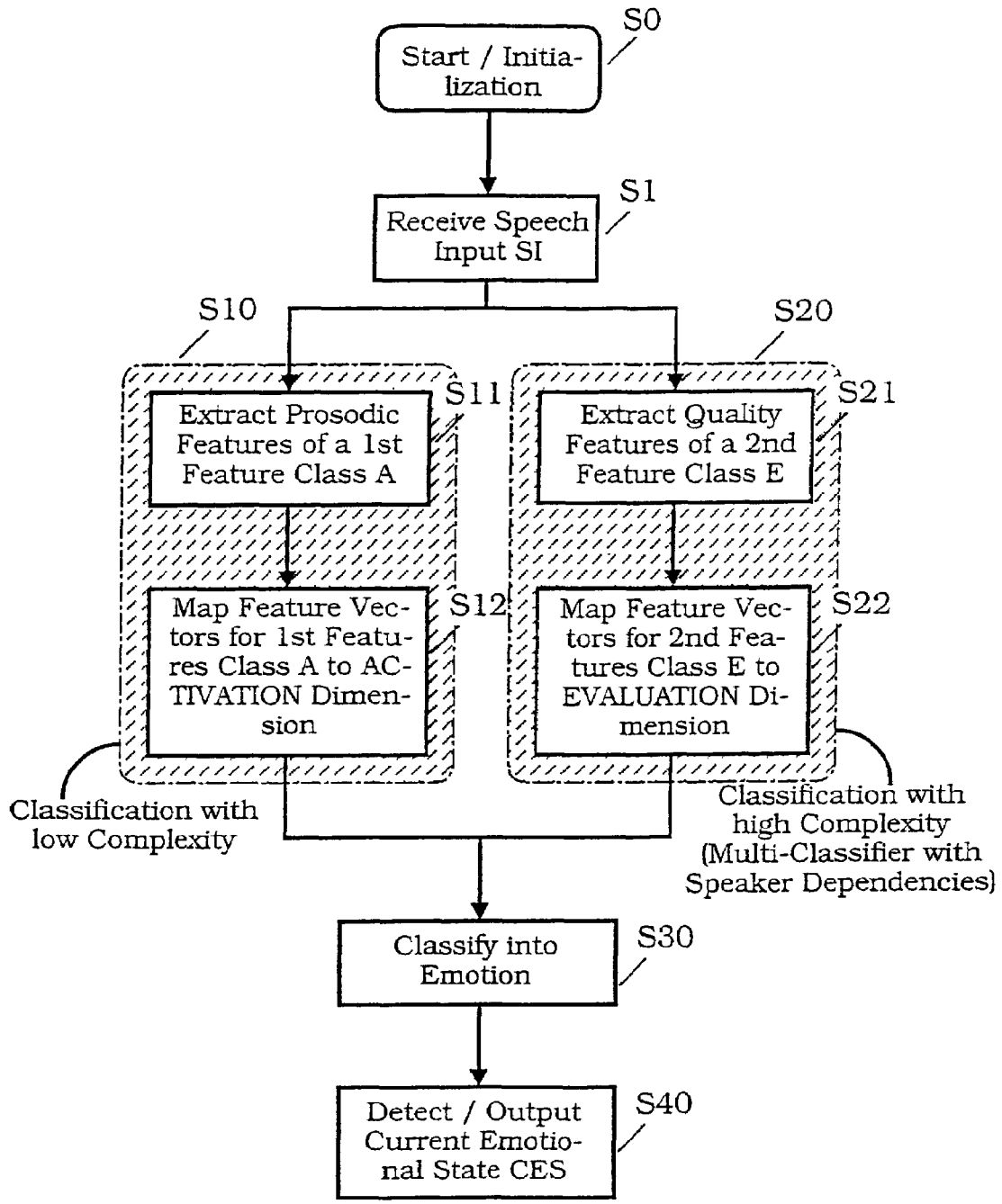
FIG. 2 is a schematical block diagram describing a preferred embodiment of the inventive method for emotion detection.

FIG. 2 elucidates by means of a schematical block diagram a preferred embodiment of the inventive method for detecting emotions from a speech input The method starts with a first and introducing step S0 in which preliminary data are provided and evaluated. In a first step S1—which might be repeated in the following—a speech input SI is received.

The method of the embodiment of FIG. 2 is mainly subdivided in a first section S10 and a second section S20 which are assigned to the evaluation of the speech input SI with respect to a first feature class assigned to a first emotional dimension of arousal/activation A and a second feature class assigned to a second emotional dimension of evaluation/pleasure in said emotional space ES, respectively. The sections S10 and S20 may be performed sequentially or in parallel, as they are essentially independent.

In the first step S11 of the first section S10 within a first feature class A of prosodic features, said prosodic features or parameters thereof are generated and extracted from the analysis of the given speech input SI. The prosodic features may comprise pitch, pitch range, loudness, speaking rate, and/or the like.

In the following step S12 of the first section S10 from said prosodic features, feature vectors are constructed and they are mapped onto the subspace of activation/arousal according to the first feature class A to classify a passive or active state of the current speaker. For the classification of the emotional state CES of the current speaker within the subspace of activation/arousal the classifier CA of comparative low complexity determines the degree of arousal/activation A.

On the other hand, in the second section S20 in a first step S21 features of a second feature class E are generated which belong to a set of voice and/or speech quality features. These quality features may include spectral tilt, amplitude difference between harmonics and formants, formants bandwidth, jitter, harmonic-to-noise-ratio, and/or the like.

In step S22 also from these features feature vectors are constructed and then mapped into the subspace or dimension of evaluation/pleasure according to the second feature class E to classify a current speaker speaking negative or positive. For the classification of the emotional state CES of the speaker in the subspace of evaluation/pleasure the classifier CE of relative high complexity is Involved and the determines the degree of evaluation/pleasure E. This complexity of the classifier CE may indeed include a multi-classifier system, speaker dependencies and/or the like.

The results coming out from these classification schemes of steps S12 and S22 may be merged and fused by evaluating in a final classification algorithm according to step S30.

Finally in step S40 a current emotional state CES of the current speaker is detected and/or output as a result of the method.

The concept of subspace specialists is essentially based on the usage of classifiers which are in each case specialized with respect to or in a certain subspace of features. The identification and assignment of feature classes with certain dimensions of the emotional space or subspaces thereof is essentially based on phonetic and phonology theory as well as on psychological and physiological studies. Any method for classifying feature vectors can be used for building said classifiers or classifier systems. These methods may include neural networks, support vector machines, Gaussian mixtures, K-next neighbours or the like.

The combination of the results from the different classifiers or specialists for each of the feature subspaces can be done with a third final classifier the inputs of which can be either degrees of each dimension or conditional emotions to each dimension and the output of which is the classified emotion.

The invention claimed is:

1. A method for detecting emotions from speech input comprising:
    evaluating, deriving and/or extracting at least a first feature class and a second feature class of features from a given speech input, wherein the first feature class does not include features of the second feature class and the second feature class does not include features of the first feature class, and the first feature class includes prosodic features and the second feature class includes voice quality features;
    associating said first and second feature classes with dimensions of an underlying emotional space including a first dimension of activation or arousal and a second dimension of evaluation or pleasure, respectively;
    using for each dimension of the underlying emotional space a specialized classifier system, each of which being configured to classify features from an assigned feature class associated with a respective feature class, wherein each specialized classifier system operates independently from each other, and each of the specialized classifier systems uses as input only features of a respectively assigned feature class; and
    combining outputs of said specialized classifier systems for each feature class to form a global classifier system configured to output a current emotional state.

2. A method according to claim 1, wherein said distinct specialized classifier systems are applied to the different feature classes already extracted from said speech input and/or to said speech input directly, and wherein derived parameters of emotions from different feature subspaces, are collected and/or stored to obtain a final classification by combination of the results.

3. A system for detecting emotions from speech input which is capable of performing and/or realizing a method for detecting emotions according to claim 1.

4. A computer readable medium including computer and readable instructions that when executed by a processor perform and/or to realize a method for detecting emotions according to claim 1.

5. A method of detecting emotions, comprising:

providing a first feature class and a second feature class of features of a speech input, wherein said first feature class comprises prosodic features and corresponds to a first dimension of an emotional space, and wherein said second feature class comprises voice quality features and corresponds to a second dimension of said emotional space, wherein the first feature class does not include features of the second feature class and the second feature class does not include features of the first feature class;

using for said first and second feature classes specialized classifier systems including a first and second classifier, respectively, wherein said first and second classifiers are configured to classify features of said first and second feature classes, respectively, said second classifier includes a plurality of single classifiers, said first classifier and said second classifier operating independently from one another, and each of the specialized classifier systems uses as input only features of a respectively assigned feature class; and combining outputs of said first and second classifiers to form a global classifier configured to output a current emotional state.

6. The method according to claim 5, wherein the first classifier gives as an output a degree of arousal.

7. The method according to claim 5, wherein the second classifier gives as an output a degree of pleasure.

8. The method according to claim 5, wherein said second classifier comprises a plurality of classifiers each of which is trained to model speaker dependencies, wherein said speaker dependencies include age and/or gender.

9. A method of detecting emotions, comprising:

providing a first feature class and a second feature class of features of a speech input, wherein said first feature class comprises prosodic features and corresponds to a first dimension of an emotional space, and wherein said second feature class comprises voice quality features and corresponds to a second dimension of said emotional space, wherein the first feature class does not include features of the second feature class and the second feature class does not include features of the first feature class;

using for said first and second feature classes specialized classifier systems including a first and second classifier, respectively, wherein said first and second classifiers are configured to classify features of said first and second feature classes, respectively, said first and second classifiers operate independently from each other, and each of the specialized classifier systems uses as input only features of a respectively assigned feature class; and combining outputs of said first and second classifiers to form a global classifier configured to output a current emotional state.

10. The method according to claim 5, wherein the second classifier classifies features of the second feature class based at least in part on speaker dependencies.

\* \* \* \* \*